United States Patent [19]

Ichihashi et al.

[11] Patent Number: 5,230,043
[45] Date of Patent: Jul. 20, 1993

[54] ARRANGEMENT FOR DIAGNOSING THE CAUSE OF COMMUNICATION INTERRUPTION BETWEEN TWO CPUS

[75] Inventors: Takao Ichihashi; Syuji Yamada; Masashi Matsumoto, all of Osaka, Japan

[73] Assignee: Mita Industrial Co., Ltd., Osaka, Japan

[21] Appl. No.: 560,832

[22] Filed: Jul. 31, 1990

[30] Foreign Application Priority Data

Jul. 31, 1989 [JP] Japan .................. 1-199631

[51] Int. Cl.⁵ .................. G06F 11/00; G06F 13/24; G06F 15/16
[52] U.S. Cl. .................................................. 395/200
[58] Field of Search ............... 395/575, 800, 725, 200; 371/48

[56] References Cited

U.S. PATENT DOCUMENTS

| | | | |
|---|---|---|---|
| 3,979,732 | 9/1976 | Hepworth | 395/385 |
| 4,223,380 | 9/1980 | Antonaccio | 395/200 |
| 4,430,700 | 2/1984 | Chadima et al. | 395/200 |
| 5,023,778 | 6/1991 | Simon et al. | 395/325 |
| 5,107,456 | 4/1991 | Schuur | 395/325 |

FOREIGN PATENT DOCUMENTS

| | | |
|---|---|---|
| 0169912 | 2/1986 | European Pat. Off. . |
| 57-185533 | 11/1982 | Japan . |
| 8705135 | 8/1987 | PCT Int'l Appl. . |
| 2080588 | 2/1982 | United Kingdom . |

Primary Examiner—David Y. Eng
Attorney, Agent, or Firm—Cushman, Darby & Cushman

[57] ABSTRACT

An arrangement for communication between two CPUs which allows diagnosis of whether the cause of an interrupt in communication between the CPUs is due to a routine interrupt or a failure in the communication line. Timers generate overflow signals in the event that data from one or the other CPU is late in arriving. Lateness is determined by comparing the timer values to stored values in memory. Control units respond to the timers and switch the transmission level of the CPUs so that they pass a predetermined signal pattern between themselves, indicating that the interrupt is in effect but that communication lines are still open. When one of the CPUs fails to detect the confirmation signal, the CPU causes a communication failure to be indicated.

6 Claims, 4 Drawing Sheets

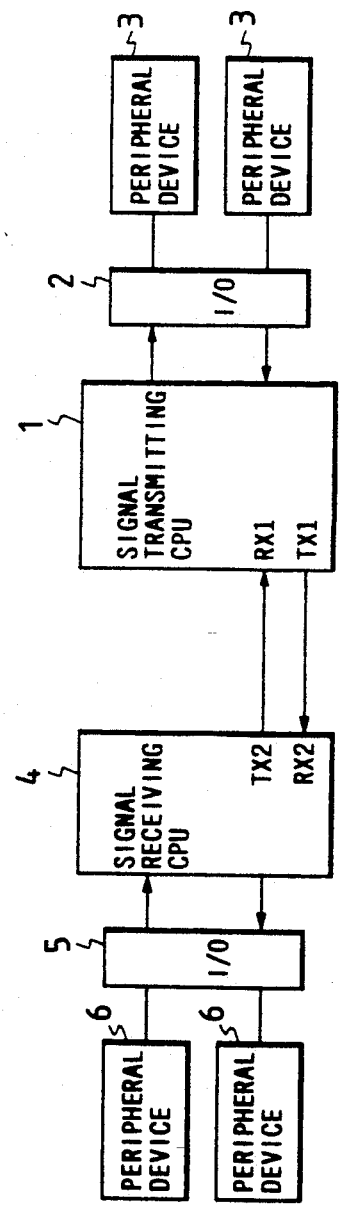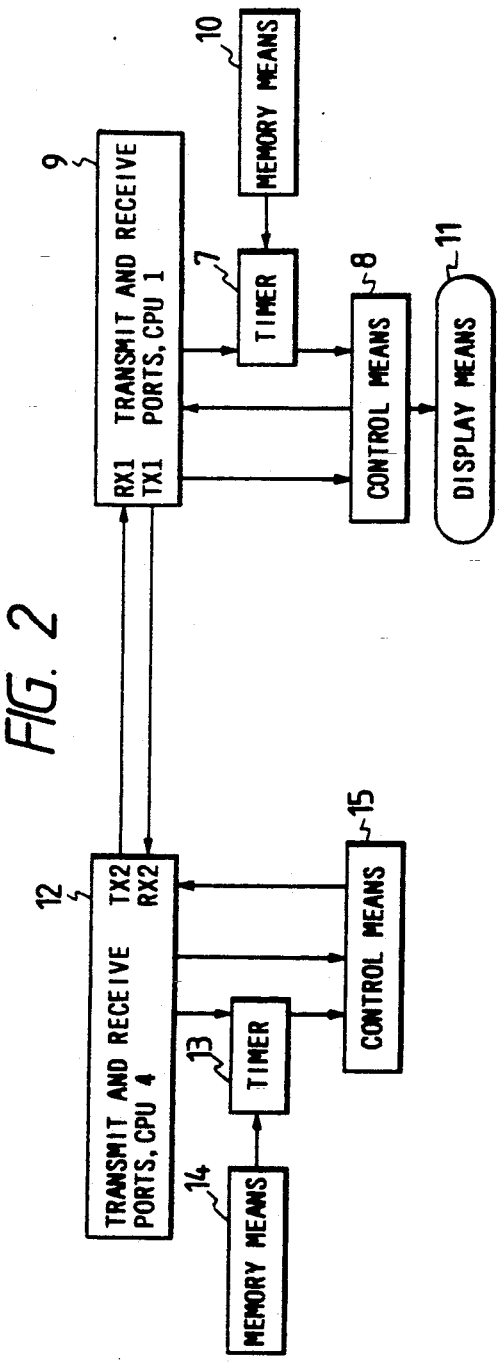

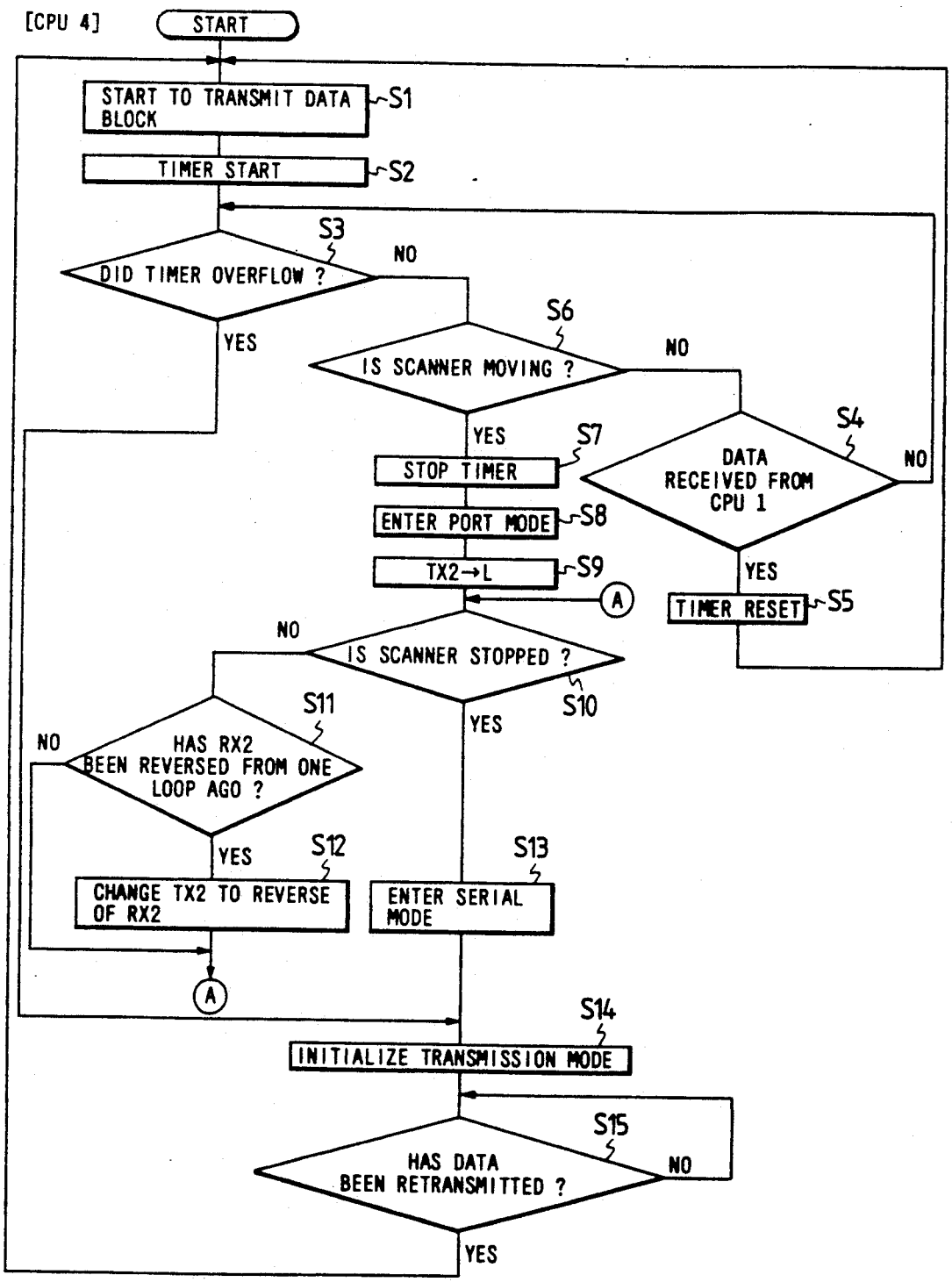

ARRANGEMENT FOR DIAGNOSING THE CAUSE OF COMMUNICATION INTERRUPTION BETWEEN TWO CPUS

BACKGROUND OF THE INVENTION

1. Field of the Invention

This invention pertains to a arrangements for transmitting data between two CPUs (central processing units).

2. Description of Related Art

Copying machines are one example of the possible environments where the present invention could be used. A conventional copying machine has a plurality of CPUs, two of which are the main control CPU and the scan CPU (for scanning an original with an optical system). The control and scan CPUs communicate through a "hand shake" system; that is, the main control CPU transmits a scan operation data block to the scan CPU, receives an answer from the scan CPU, and then transmits the next data block.

Within the copying machine context, typically the scan CPU must respond to the main control CPU within a time window of from 150 microseconds to 1.25 milliseconds. If a periphery device needs the attention of the scan CPU while the main control CPU is trying to communicate with the scan CPU, then the periphery device will send an interrupt signal to the scan CPU. The scan will then interrupt the main control CPU and the control CPU suspends communications. When the other functions have been attended to the scan CPU will clear the interrupt and send a return data block to the control CPU. Communication between the scan and control CPUs resumes.

But there are causes other than an interrupt from the scan CPU that may result in suspension of communications. There may be a failure in the communication line, preventing transmission of the return data block—for example, there may be a disconnection or a short circuit in the line. According to the current state of the art, the main control CPU will be unable to distinguish whether the communications interruption resulted from a routine interrupt from the scan CPU or from a more serious failure such as a defect in the communication line.

In view of this problem, an object of this invention is to provide a communication arrangement between CPUs in which, when communication is suspended, it will be possible to identify whether or not the cause of the suspension is due to a failure in the communication line.

SUMMARY OF THE INVENTION

This invention provides an arrangement for transmitting data between two CPUs which makes it possible to distinguish between different causes of communication interruption.

The arrangement operates in a serial communication mode for signal transmitting and receiving between the two CPUs under normal conditions.

An ordinary communication mode is provided for signal transmitting and receiving between the two CPUs when a peripheral device makes an interrupt request to the signal receiving CPU (scan CPU). Under the ordinary communication mode, the two CPUs transmit a confirmation signal in the form of a square wave (high-low-high pattern) to verify that the interruption is still in effect. When the CPUs cannot pass the confirmation square wave, the system warns of a failure in the communication line.

Furthermore, in the above-described method:

If the signal receiving CPU does not make an interrupt then both the transmitting and receiving CPUs will employ a serial communication mode.

If a peripheral device requests an interrupt from the signal receiving CPU then the method calls for the two CPUs to communicate according to the ordinary communication mode. In the ordinary communication mode, the CPUs employ a different signal pattern than that employed in the serial communication mode. The signal receiving and transmitting ports of both the signal transmitting (main control) and signal receiving (scan) CPUs will change their outputs to implement the ordinary communication mode. This is accomplished as follows:

a) The signal receiving CPU initiates the ordinary communications mode by switching the signal level of its signal transmitting port to output a constant low signal level (0) to the signal transmitting CPU.

b) The signal transmitting CPU, when no return communication data is received from the signal receiving CPU, first confirms that the signal level of its own receiving port is at a low level (which it should be due to the signal receiving CPU's low output). After confirming the level of its receiving port, the transmitting CPU switches the level of its transmitting port to output a low signal back to the signal receiving CPU.

c) The signal receiving CPU then confirms that its receiving port has been set low and switches the level of its transmitting port to a high level. The high level is detected by the signal transmitting CPU, which echoes the high level back to the signal receiving CPU. The signal receiving CPU detects that its receivng port has gone high, and switches its output to low, and the process continues. The low-high-low pattern propagates between the two CPUs as long as the interrupt exists.

After the peripheral device clears the interrupt request from the signal receiving CPU, the signal receiving CPU resumes normal serial communication. The signal transmitting CPU confirms that the receiving CPU has resumed normal communication, and then switches its own ports back to their normal state.

The signal pattern described in (c) allows for detection of a failure in the communication line. If the signal transmitting CPU is unable to receive the low-high-low confirmation signal from the signal receiving CPU, then it warns of a communication line failure.

BRIEF DESCRIPTION OF THE DRAWINGS

FIG. 1 is a block diagram showing a system with two CPUs which employ the communication arrangement of the present invention.

FIG. 2 is a block diagram showing the system architecture of the CPUs.

FIG. 5 is a flow chart depicting operations of the signal receiving (scan) CPU (4).

DETAILED DESCRIPTION OF THE PREFERRED EMBODIMENT

Figure 3:
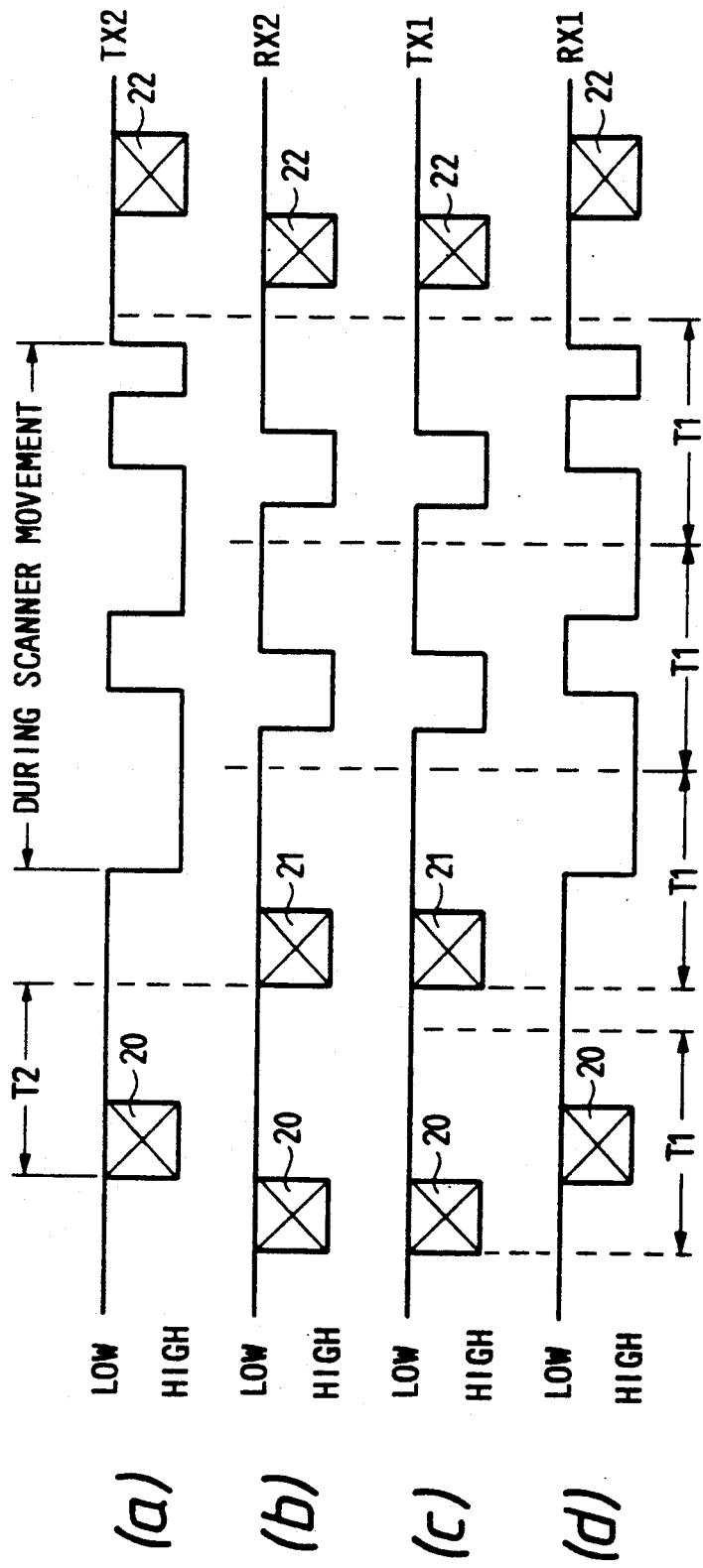
FIG. 3 is a timing diagram showing data flow between the CPUs.

One embodiment of the present invention will now be described with reference to the accompanying drawings.

In FIG. 1, the first CPU 1 can be, for example, the main control CPU (signal transmitting CPU) in a copying machine. The CPU 1 has a signal receiving port RX1 and a signal transmitting port TX1. The CPU 1 has associated with it an input/output control unit 2 for controlling transmission of signals between the CPU 1 and various peripheral devices 3, such as an operating board, keyboard, clutch, and motor.

A second CPU 4 can be a scan CPU (signal receiving CPU) in the copying machine. Similar to the first CPU 1, the second CPU 4 has a signal receiving port (RX2) and a signal transmitting port (TX2). The CPU 4 also has associated with it an input/output control unit (5), which controls transmission of signals between the CPU 4 and various peripheral devices 6 such as a scanning motor and clutch.

FIG. 2 is a block diagram showing more system architecture detail. Reference numeral 9 designates first signal transmitting and receiving means for transmitting data from CPU 1 to CPU 4, and for receiving return data from CPU 4. The first signal transmitting and receiving means 9 has associated with it a first memory means 10 which stores a first reference time T1. Reference time T1 is an amount of time which is much longer than the time it routinely takes for CPU 1 to transmit a data block to CPU 4 and to receive an answer from CPU 4. A first timer 7 receives the first reference time T1 from memory means 7.

The first timer 7 also receives a start time marking a data transmission from the signal transmitting and receiving means 9, and an end time marking the reception of return data from CPU 4. Whenever CPU 1 receives return data from CPU 4, the first timer 7 is cleared in preparation for the next data transmission; but before it clears, it performs a comparison operation.

The first timer 7 compares the time counted for actual data transmission with the first reference time T1, and outputs a time overflow signal if the time counted exceeds T1. The time overflow signal (if one is created) is sent to first control means 8. In response to the time overflow signal, the first control means 8 controls the first transmitting and receiving means 9. This operation is described in detail later in the specification.

Further in FIG. 2, reference numeral 12 designates second signal transmitting and receiving means which receives data from CPU 1. The second signal transmitting and receiving means has features similar to that of the first signal transmitting and receiving means, including second memory means (14) which stores second reference time T2. T2 is an amount of time much longer than the time it routinely takes to send a response to a data transmission from CPU 1 and then receive the next data block from CPU 1. A second timer 12 receives a start time when the response from CPU 4 to CPU 1 is sent off, and receives an end time when another data block sent by CPU 1 to CPU 4 is received.

Before the second timer 12 is cleared, a comparison is made between the time on second timer 12 and T2, and an overflow signal is sent to T2's control means 15 if the time exceeds T2. In response to the overflow signal, the second control means 15 controls the second signal transmitting means 12, and this operation is described further on in the specification.

In the two situations described above, one timer will generate an overflow whenever the other CPU takes longer than the reference time (T1 or T2) to respond. But if data does appear (although it may be late) then the timer will be reset and the system will ignore the overflow (Step S5, FIG. 4). It is in the case where a timer generates an overflow but the other CPU never sends a return data block that the system enters into the ordinary communication mode.

FIG. 3 is a timing diagram showing the timing of data transmissions between CPUs 1 and 4. FIG. 3a shows the signal level at the signal transmitting port TX2 of CPU 4; FIG. 3b shows the signal level at the signal receiving port RX2 of CPU 4; FIG. 3c shows the signal level at the signal transmitting port TX1 of CPU 1; and FIG. 3d shows the signal level at the signal receiving port RX1 of CPU 1 During serial communication, TX1, RX1, TX2, and RX2 are in a serial communication mode.

Figure 4:
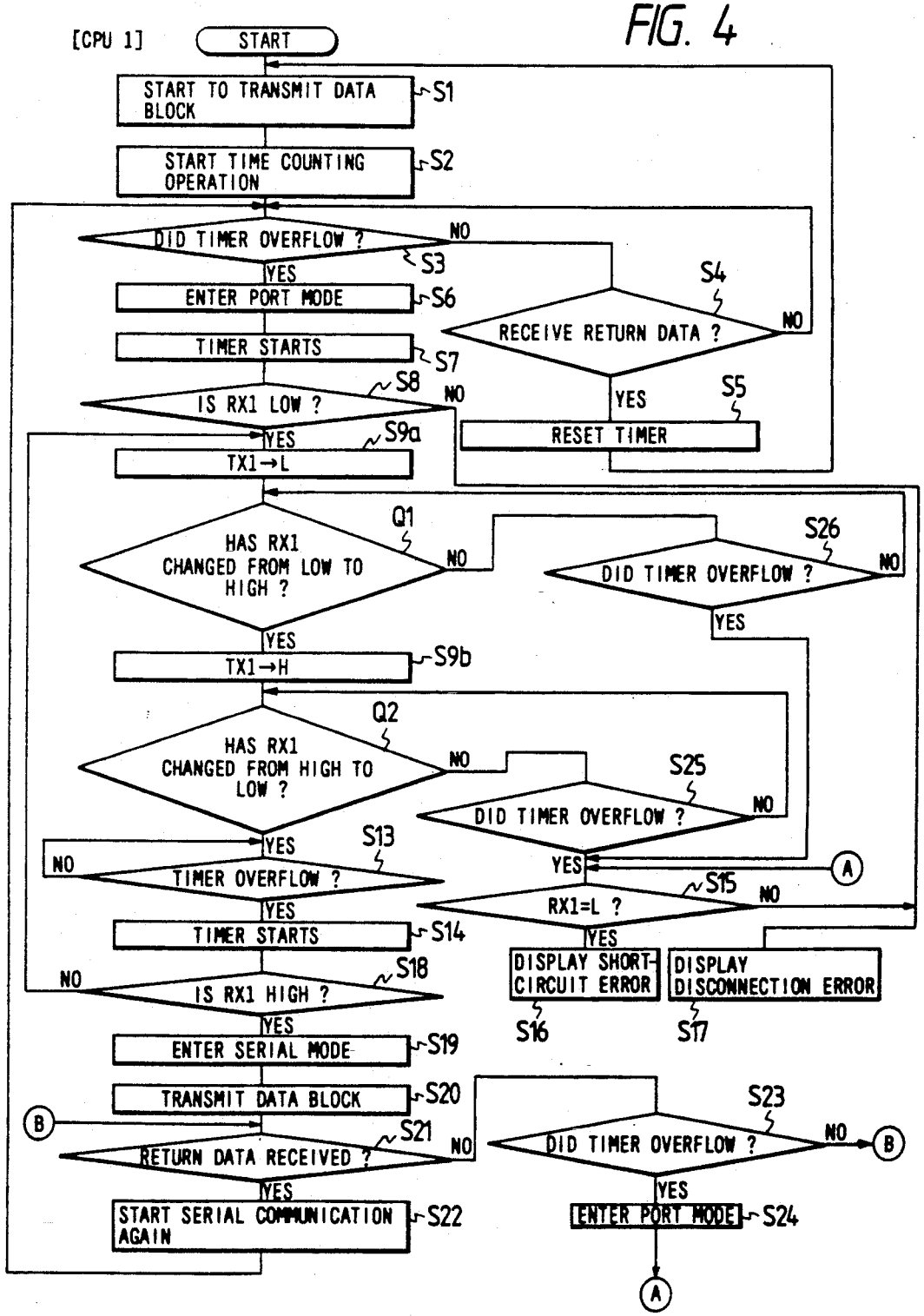
FIG. 4 is a flow chart depicting operations of the signal transmitting (main control) CPU (1).

FIG. 4 illustrates the steps taken in CPU 1's data transmission and reception process. First, CPU 1 transmits a data block 20 through the signal transmitting port TX1 to CPU 4 (Step S1). Concurrent with the transmission, the first timer starts its time counting operation (Step S2). After CPU 4 returns the data block 20 to CPU 1, the first timer 7 compares the time counted with the first reference time T1 (Step S3). If the time counted is less than T1, and return 0 data is eventually received (Step S4), then the first timer 7 is reset (Step S5). Then, the next data block 21 is transmitted (Step SI), and the first timer 7 is started again.

FIG. 5 is a flow chart of the steps taken by CPU 4 in the data transmission and reception process. When data block 20 from CPU 1 is received through port RX2 (FIG. 3b), CPU 4 sends the data block back to CPU 1 (Step S1) and begins its timer 13 (Step S2). The timer is checked for overflow (Step S3). If no scanning interrupt (denoted by scanner movement, Step S6) occurs, then when data block 21 is received by CPU 4 (FIG. 3b) (Step S4) the timer is reset (Step S5). The next transmission/reception operation takes place.

If a scanning interruption occurs within the time T2 interval (Step S6 of FIG. 5), then the second CPU 4 suspends the operation of timer 13 (Step S7) and the transmission and reception ports TX2 and RX2 are switched from serial communication to "port mode" (Step S8) in order to implement the ordinary communication mode. In the "port mode" the transmission and reception ports of the CPU transmit and receive signals that are different from the data blocks that are exchanged in the serial communication mode. After TX2 and RX2 have been changed to "port mode," TX2's output is held low (Step S9).

When CPU 1 fails to receive the data block back from CPU 4, time counted will exceed T1, and the timer generates an overflow signal (Step S3 of FIG. 4). As a result, the signal transmitting and receiving ports TX1 and RX1 of CPU 1 are switched from serial communication mode to port mode (Step S6), in order to implement the to ordinary communication mode, and the first timer 7 is started again (Step S7). First control means 8 then detects whether or not the signal receiving port RX1 is at low level (Step S8). The first control means will determine that the signal receiving port RX1 is indeed at low level (since TX2 of CPU 4 is emitting a low level to RX1), and the first control means will cause transmitting port TX1 to emit zeroes as well (Step S9a of FIG. 4, and also FIG. 3c).

As long as the scanner is moving (scanner is not stopped, Step S10 of FIG. 5), the second CPU 4's control unit (second control means 15) will detect the level of RX2 (Step S11). If the level of RX2 is low, (which it will be due to TX's output of zeroes) then the control unit 15 will switch TX2 to high (Step S12 of FIG. 5, and also FIG. 3a). The high level will propagate to CPU 1, and CPU 1 will detect the high at RX1 (Step Q1, FIG. 4) and transmit it back to CPU 4 (Step S9b, FIG. 4). CPU 4 receives the high signal at RX2. CPU 4 checks the level of the signal to verify that it has been reversed from the previous level one loop before (Step S11, FIG. 5), and if the signal has been reversed, then TX2 emits the reverse of the signal received at RX2 (transmitting port TX2 will be set back to a low level again, since RX2 is high. Step S12, and also FIG. 3a). The square wave pattern will continue to propagate through the system as confirmation of the fact that the lines of communication between the CPUs are still functioning, and that the interrupt is still in effect. The period of the square wave will be approximately T1, which is the amount of time needed for data to propagate through the system. Under the ordinary communication mode, therefore, the signal propagates according to the following chart:

| START | RX1 | TX1 | RX2 | TX2 |
| --- | --- | --- | --- | --- |
| (CPU 4 emits low) | L | L | L | H |
| | H | H | H | L |
| | L | L | L | H |
| | H | H | H | L |
| etc. | | | | |

When the interrupt is cleared (Step S10 of FIG. 5) (the scanner has stopped moving), the transmitting and receiving ports TX2 and RX2 of CPU 4 are changed back to normal serial communication mode (Step S13), and a constant 1 is emitted from TX2 (Step S14, and also FIG. 3a) to initiate the serial communication mode.

The first control means 8 of CPU 1 detects the level of receiving port RX1 (which is high because of TX2's output of 1) which indicates that the scanning interrupt has cleared (Step S18 in FIG. 4). When it detects the high level at RX1, it switches communication back to normal serial communication (Step S19). The CPU 1 transmits the next data block 22 (Step S20). When CPU 1 receives the return data from CPU a (Step S21), the CPUs resume serial communication (Step S22 of FIG. 4, Step S15 of FIG. 5). If no return data is received, then the timer is checked for overflow (Step S23), and if an overflow exists, port mode is entered into (Step S24) and CPU 1 enters the ordinary communications mode again.

Now, suppose there is a failure in the communication line. CPU 4 will not send return data and an overflow will occur with timer 7. At this point CPU 1 does not know whether CPU 4 is requesting an interrupt or whether a communication line failure has occurred. Consistent with what has been described, CPU 1 will revert to the port mode in order to implement the ordinary communication mode (Step S6) due to the overflow, and control means 8 will detect the level of RX1, which may be either low or high.

If RX1 was left low than control means 8 will switch the level of TX1 to low and transmit the level back to CPU 4. But since there is a communication line failure, either the low signal will not reach CPU 4 or the high signal that CPU 4 sends out in response to CPU 1's signal will not be received by CPU 1. Thus the next time that timer 7 (which occurs at step S26 or S25 of FIG. 4) overflows (no data received by CPU 1 within T1), and control means 9 detects the level of RX1 (Step S15 of FIG. 4), it will find that the level remained low instead of changing to high. The system will display a short circuit failure warning in this case on display means 11 (Step S16).

If RX1 was left high, on the other hand, then an error is immediately detected, since no data was ever received yet a low signal was not sent by CPU 4 indicating ordinary communication mode. The system displays a disconnection warning in this case (Step S17). Thus the system allows for detection of communication failures and for routine interrupts.

What is claimed is:

1. A method of communicating between a first CPU and a second PCU capable of interrupting the first CPU, comprising the steps of:
   communicating between the first and second CPUs according to a serial communication mode, the serial communication mode being characterized by an exchange of data blocks between the first and second CPUs, when no interruption has been sent by another device to the second CPU, and
   communicating between the first and second CPUs according to an ordinary communication mode when the second CPU receives a request for an interrupt, the ordinary communication mode comprising the steps of:
   a) sending by the second CPU to a signal receiving port of the first CPU a first signal level indicating that it is operating in the ordinary communication mode, the first signal level being of a different signal pattern than a data block,
   b) determining whether or not the first CPU has received a data block from the second CPU, and if no data block has been received, sending by the first CPU a return signal to a signal receiving port of the second CPU at a signal level in accordance with the ordinary communication mode,
   c) determining whether or not the second CPU has received a data block from the first CPU, and if the data block has not been received, sending by the second CPU a signal to the signal receiving port of the first CPU at a signal level in accordance with the ordinary communication mode,
   d) detecting by the first CPU a change in signal level sent by the second CPU,
   e) if the first CPU does not detect a change in the signal level sent by the second CPU, indicating on a display a communication failure, and
   f) repeating steps b) through e) until the interruption has ended.

2. A method according to claim 1, wherein step b) comprises the steps of:
   a) starting a first timer when a data block is sent from the first CPU to the second CPU,
   b) stopping the first timer when a return data block is received by the first CPU,
   c) comparing the time counted on the first timer with a reference time T1,
   d) generating an overflow signal if the time counted on the first timer is greater than T1, e) if a data block is eventually received beyond the time T1, ignoring by the first CPU the overflow signal but if a data block is not received at all, controlling the first CPU in response to the overflow signal.

3. The method according to claim 2, wherein the step of controlling the first CPU comprises the steps of:

a) verifying by a first CPU control means that the signal receiving port of the first CPU is at a signal level in accordance with the ordinary communication mode, b) switching by the first control means the level of the output of the signal transmitting port of the first CPU to either a first or second signal level.

4. A method according to claim 1, wherein step b) comprises the steps of:

a) starting a second timer when a data block is sent from the second CPU to the first CPU, b) stopping the second timer when a return data block is received by the second CPU, c) comparing the time counted on the second timer with a reference time T2, d) generating an overflow signal if the time counted on the second timer is greater than T2, e) if a data block is eventually received beyond the time T2, ignoring by the second CPU the overflow signal but if a data block is not received at all, controlling the second CPU in response to the overflow signal.

5. The method according to claim 4, wherein the step of controlling the second CPU comprises the steps of:

a) verifying by a second CPU control means that the signal receiving port of the second CPU is at a signal level in accordance with the ordinary communication mode, b) switching by the second control means the level of the output of the signal transmitting port of the second CPU to either a first or second signal level.

6. A system for communication between a first CPU and a second CPU capable of interrupting the first CPU, comprising:

first and second memory means for storing reference times T1 and T2 respectively, first timer means for counting the amount of time required to send a data block from the first CPU to the second CPU and to receive an answer from the second CPU, the first timer means comparing the time counted to reference time T1 and generating a first overflow signal if the answer is not received within the reference time T1, second timer means for counting the amount of time required to send a data block from the second CPU to the first CPU and to receive the next data block from the first CPU, the second timer means comparing the time counted to the reference time T2 and generating a second overflow signal if the next data block is not received within the reference time T2, first and second control means responsive to the overflow signals generated by the first and second timer means, the first and second control means switching the signal level of a signal transmitting port of the first or second CPUs respectively, to a first or second signal levels in accordance with an ordinary communication mode, indicating means responsive to the first or second control means for indicating a condition where the first or second control means has not detected.

* * * * *